July 7, 1964  A. J. BRADFORD ETAL  3,139,793
SYSTEM FOR STRIP FILM PROJECTION
Filed Dec. 19, 1960  7 Sheets-Sheet 5
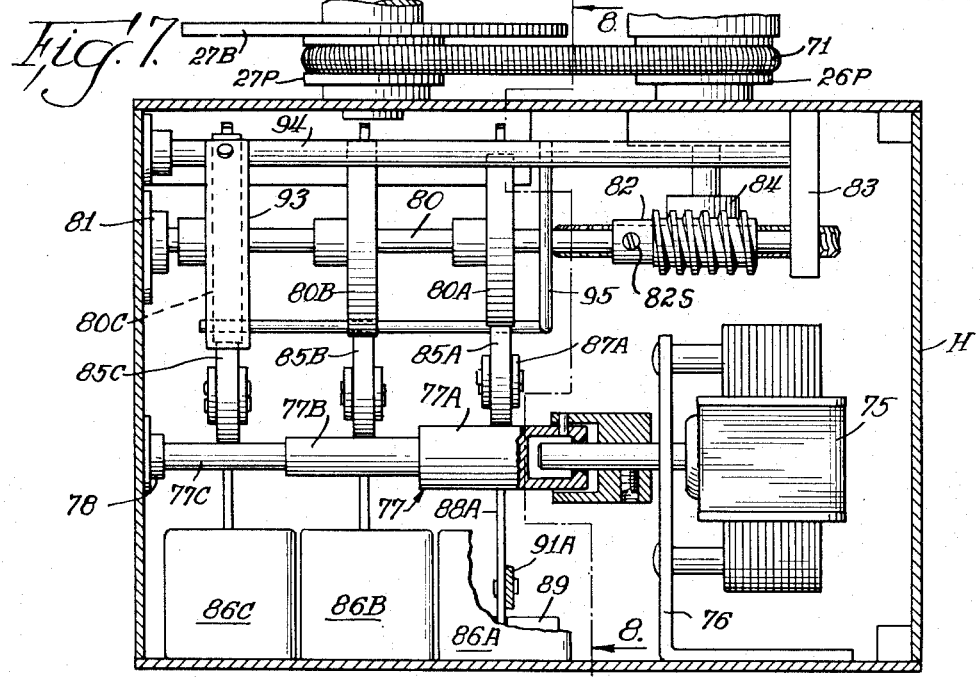
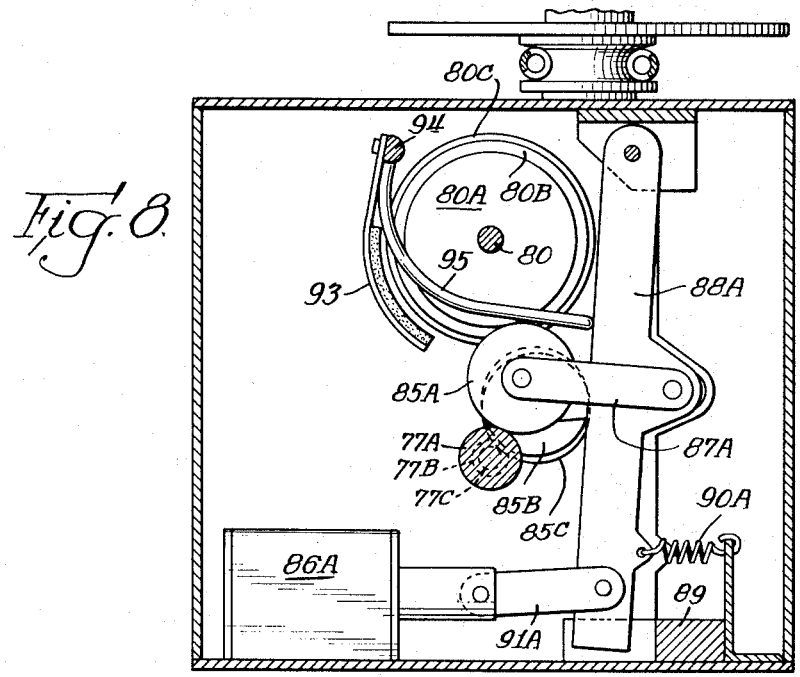
INVENTORS
Arthur J. Bradford
and Arthur E. Eigsti
By Eugene M. Giles Att'y.

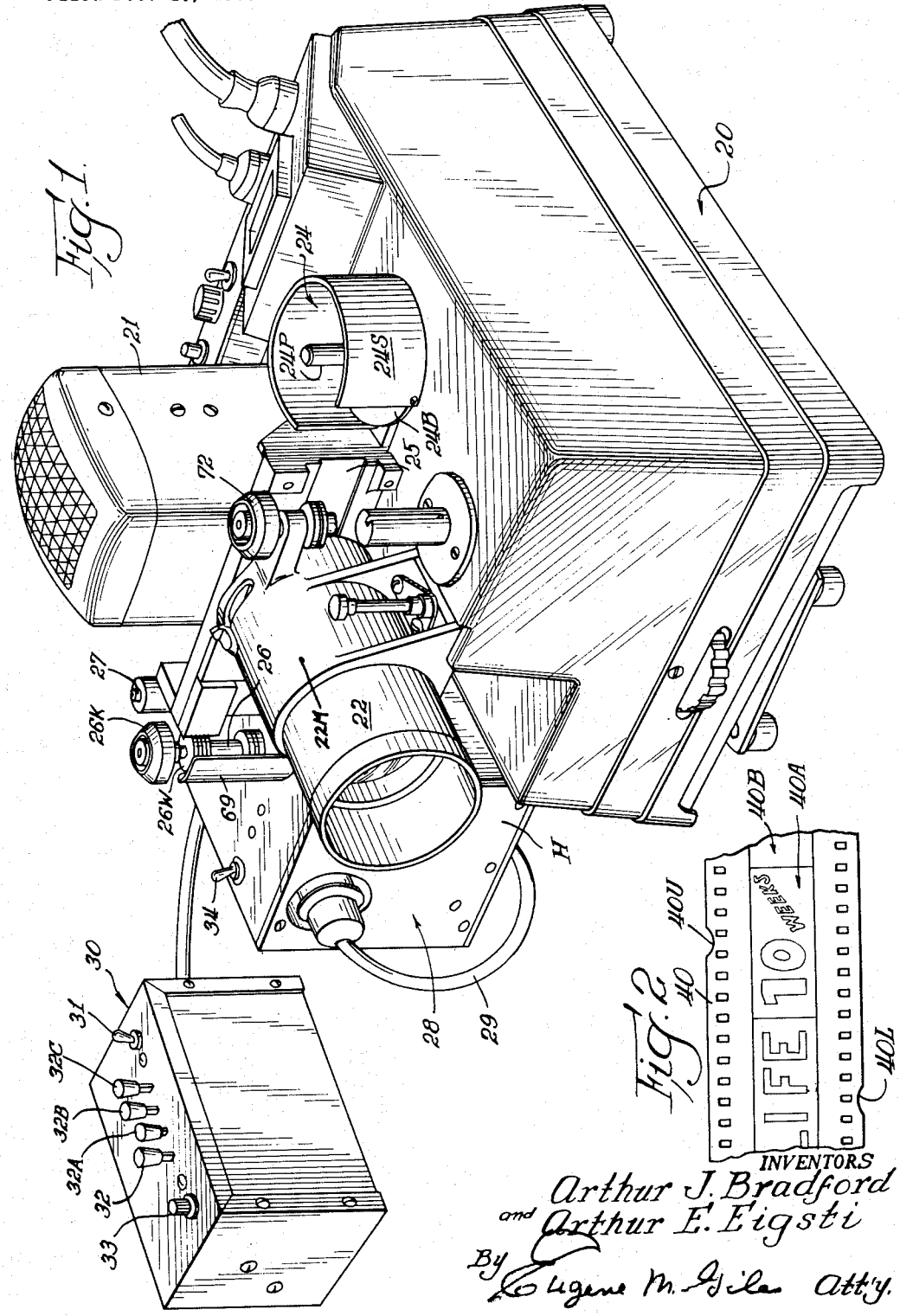

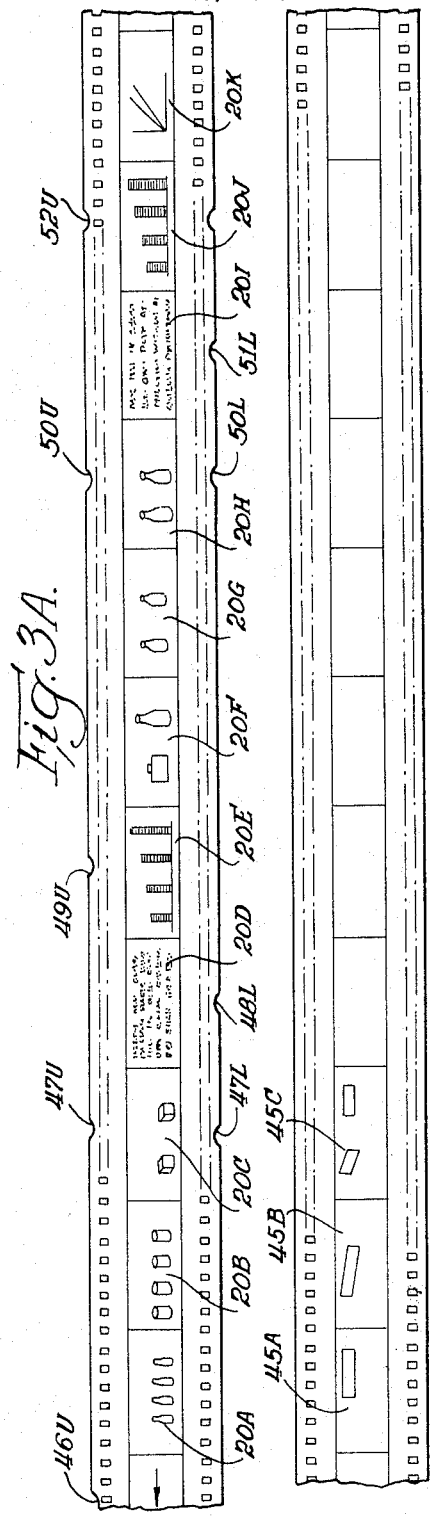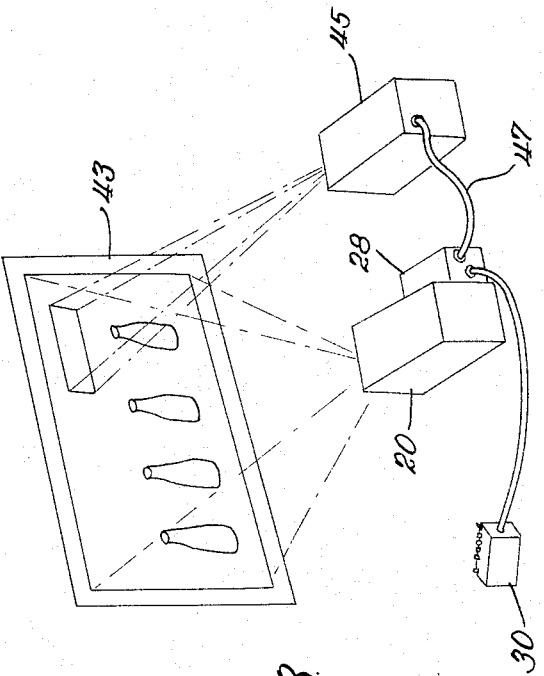

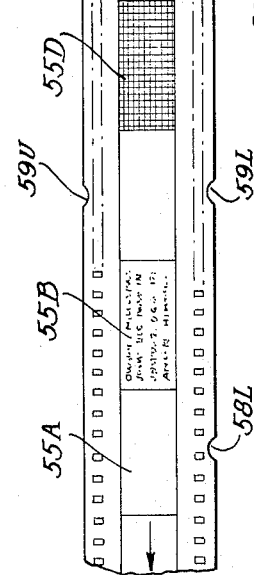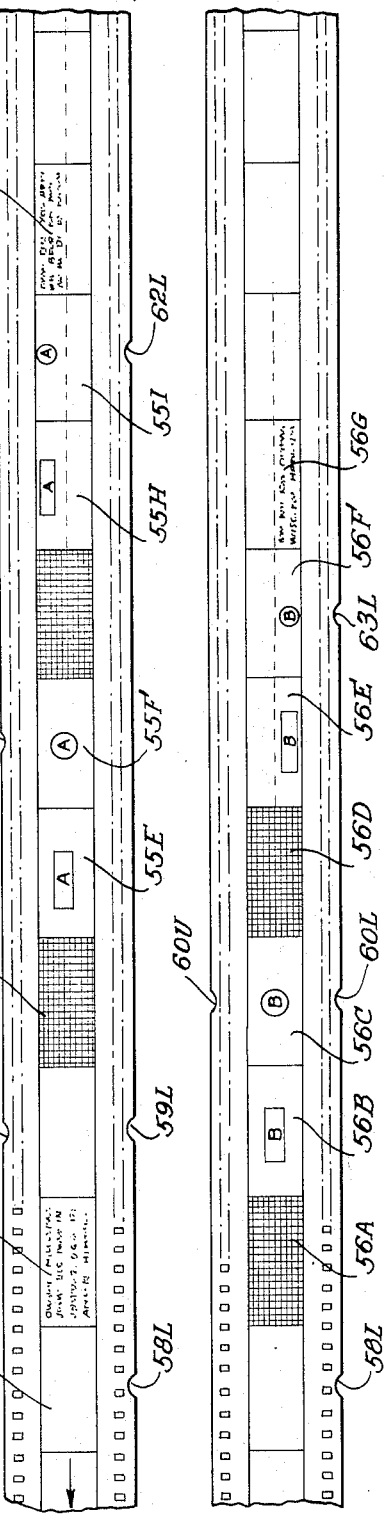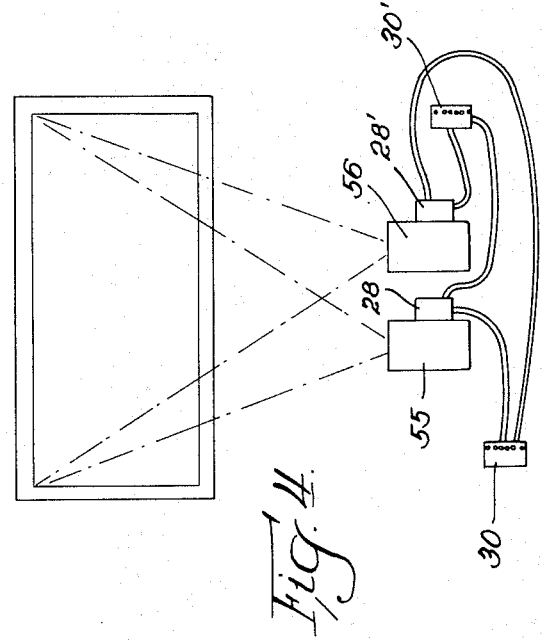

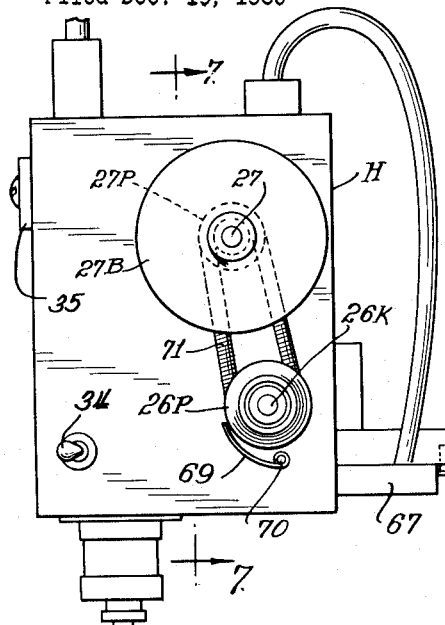
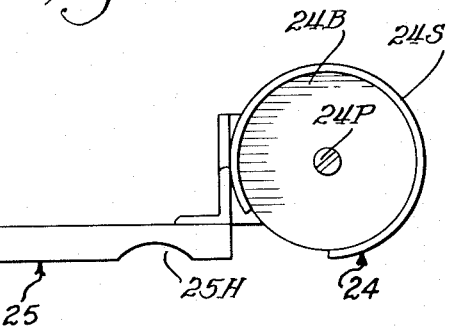
Fig. 5.
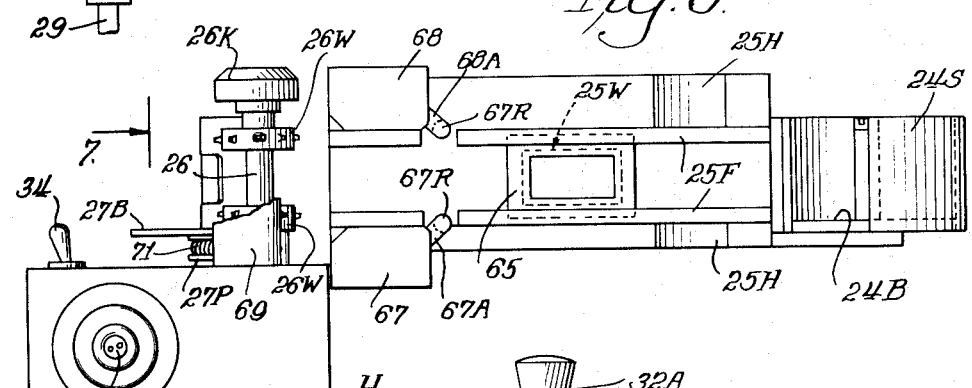
Fig. 6.
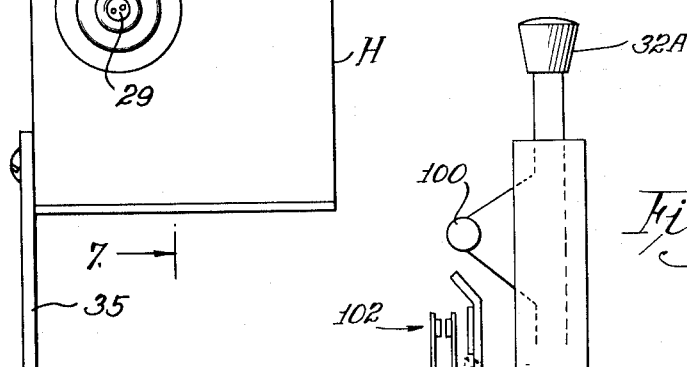
Fig. 10.
INVENTORS
Arthur J. Bradford
and Arthur E. Eigsti
By
Atty.

July 7, 1964  A. J. BRADFORD ETAL  3,139,793
SYSTEM FOR STRIP FILM PROJECTION
Filed Dec. 19, 1960  7 Sheets-Sheet 7
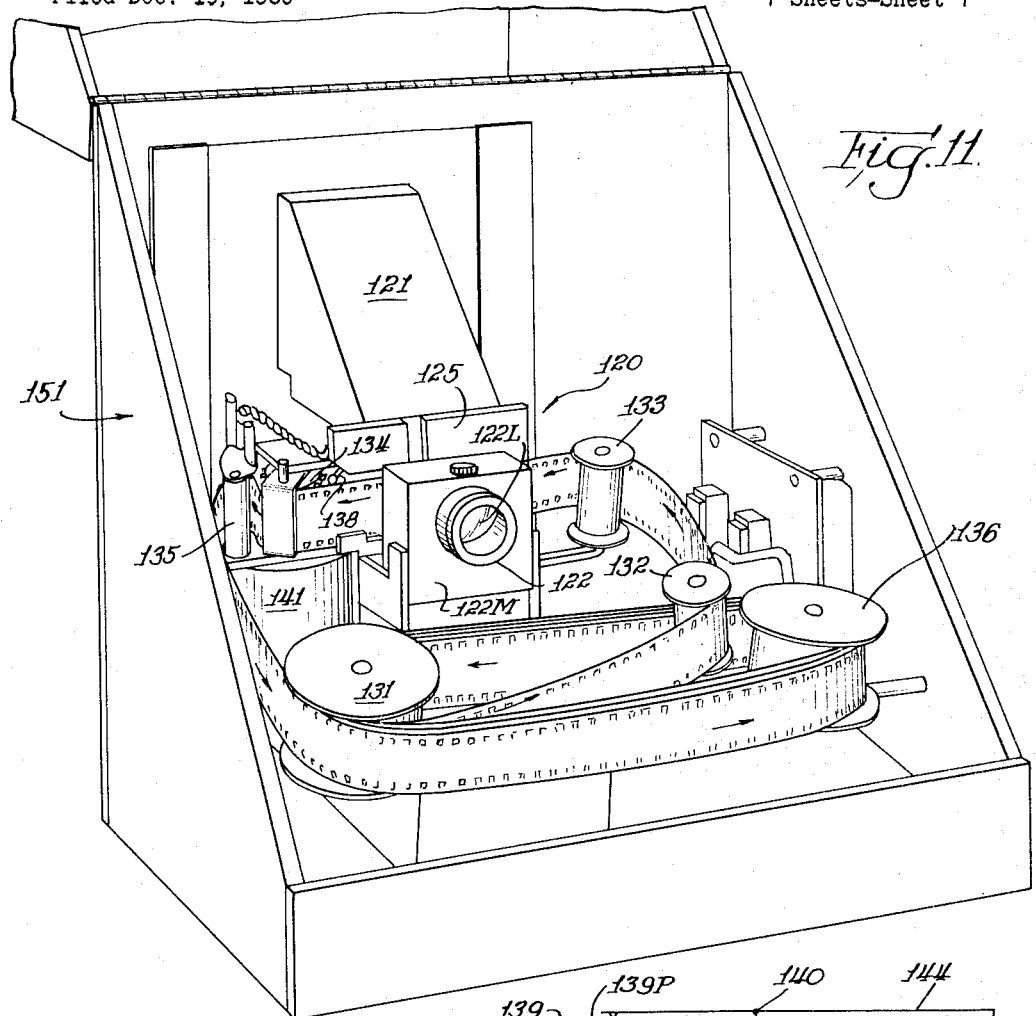
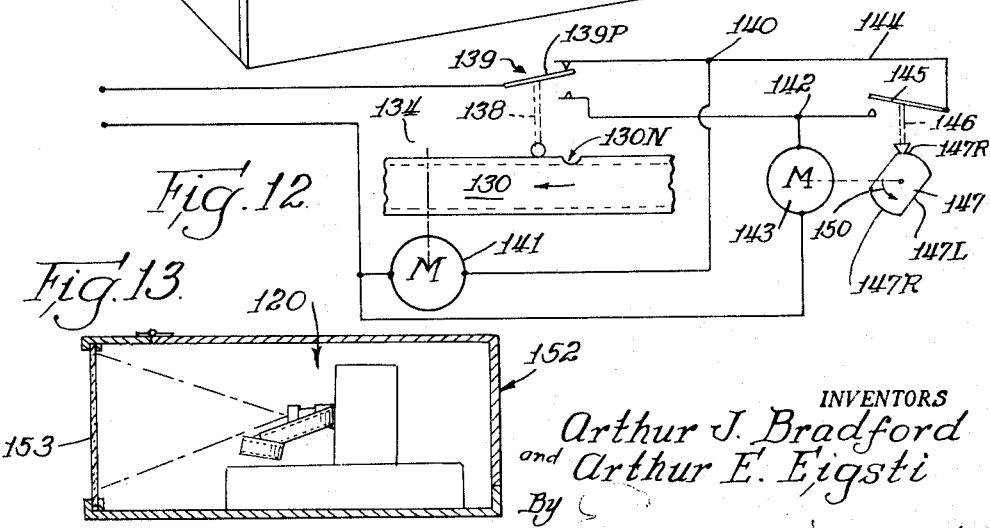
INVENTORS
Arthur J. Bradford
and Arthur E. Eigsti
By
Atty.

United States Patent Office 3,139,793
Patented July 7, 1964

3,139,793
SYSTEM FOR STRIP FILM PROJECTION
Arthur J. Bradford and Arthur E. Eigsti, Chicago, Ill.,
assignors to Wilding, Inc., a corporation of Michigan
Filed Dec. 19, 1960, Ser. No. 76,605
9 Claims. (Cl. 88—28)

This invention relates to facilities for projecting strip film to provide novel presentations having particular value in advertising, display and promotional work.

In a preferred form, the invention provides for continuously drawing a strip film through a slide film projector to create a parading display that may be speeded up, slowed down, or stopped as desired and that may be keyed with an auxiliary projector or other device operable alternately or simultaneously therewith.

In the case of an auxiliary projector, it may be desired to impose either a stationary or movable image for viewing jointly with the image from the main projector. Alternatively, the auxiliary projector may be operated in alternating sequence with the main projector to provide a variety of visual effects and presentations.

Under appropriate circumstances, the auxiliary device for operation in conjunction with the main projector may provide desired audio effects for added realism or may provide announcements and explanations relating to the visual presentation.

The principal object of the invention is the provision of a novel film drive and control unit for strip film projection, the unit being suitable for either manual or automatic operation from a local or remote control point and being adapted for use in conjunction with auxiliary equipment that is operable in predetermined sequence therewith.

Another object of the invention is to provide indexing on the film to automatically control the projection unit and the auxiliary equipment.

Still another object of the invention is to provide a variable speed film drive for the projection unit.

A further object of the invention is to provide automatic braking on the film drive to achieve accurate control of the stop position.

The following description and the drawings are given merely to explain and illustrate the invention and the manner in which it may be performed, and the invention is not to be limited thereto except insofar as the appended claims are so limited, since those skilled in the art who have this disclosure before them will be able to make modifications and variations therein without departing from the scope and spirit of the invention.

In the accompanying drawings forming a part of this specification and in which like numerals are employed to designate like parts throughout the same:

FIG. 1 is a perspective view illustrating a horizontal slide projector having a film drive mechanism and a remote control unit in accordance with the present invention;

FIG. 2 is a fragmentary view of a length of strip film for use in the projector of FIG. 1, with the film having index markings along the edge thereof;

FIG. 3 is a diagrammatic illustration of one system of projection utilizing the principles of this invention;

FIGS. 3A and 3B are fragmentary views of sections of two strip films utilized in the projection system of FIG. 3;

FIG. 4 is a diagrammatic illustration of another system of projection utilizing the principles of this invention;

FIGS. 4A and 4B are fragmentary views of sections of two strip films utilized in the projection system of FIG. 4;

FIG. 5 is a top plan view of the film drive attachment mechanism of this invention;

FIG. 6 is a horizontal front view of the attachment mechanism of FIG. 5;

FIG. 7 is a detailed side-elevational view of the variable speed motor-powered film drive mechanism, with parts thereof broken away and sectioned;

FIG. 8 is a detailed sectional view taken approximately on the line 8—8 of FIG. 7;

FIG. 10 is a detailed elevational view of a push button type control switch mechanism for use in the circuit of FIG. 9;

FIG. 11 is a perspective view illustrating a motor driven continuous strip film projector equipped with an automatically timed control unit responsive to index markings on the strip film;

FIG. 12 is a schematic diagram of an automatic motor control and timing circuit employed in the projector of FIG. 11; and FIG. 13 is a side elevational view illustrating the projector of FIG. 11 embodied in a cabinet unit having a self-contained projection screen.

*General Arrangement*

Figure 9:
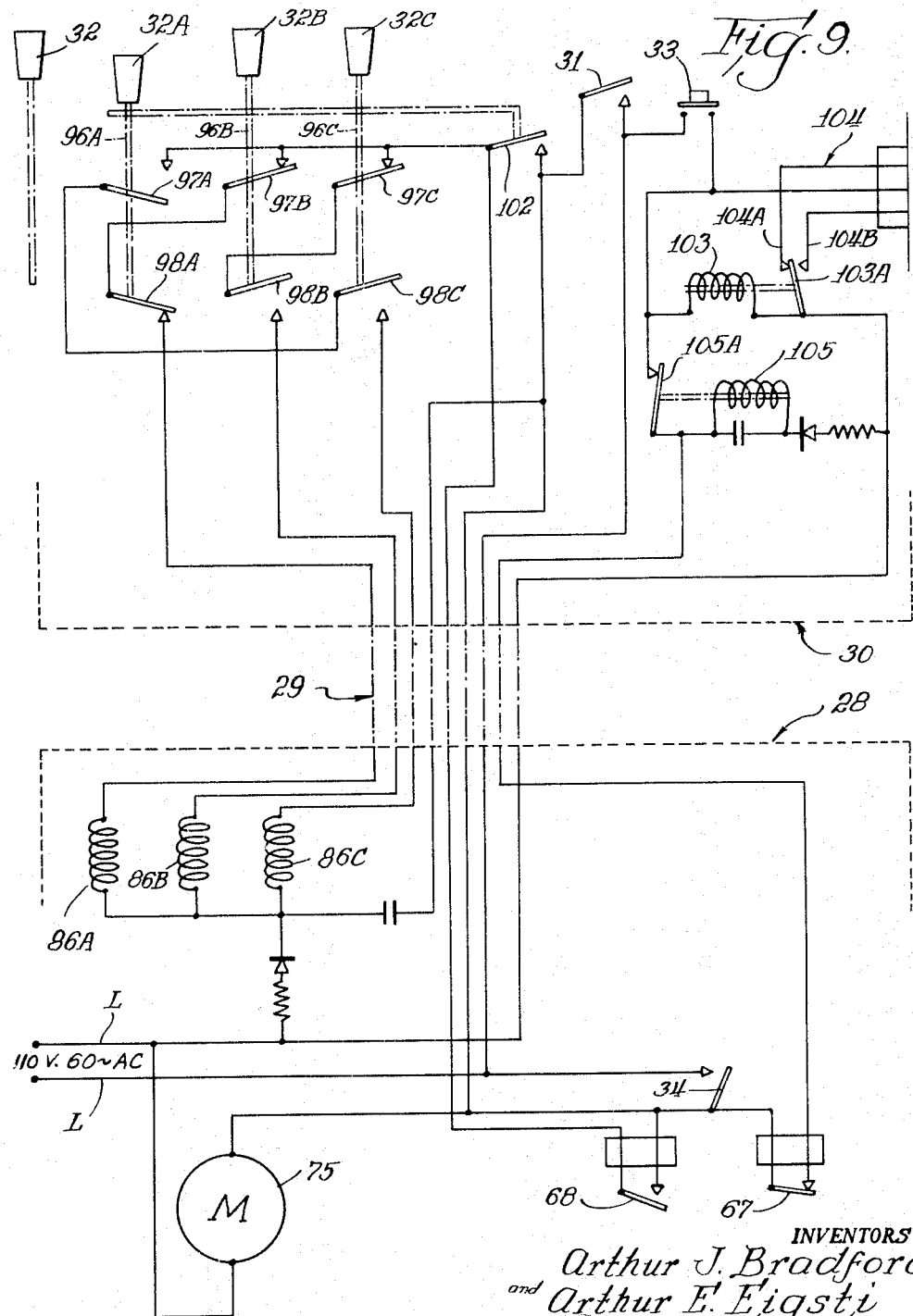
FIG. 9 is a circuit diagram for the remote control unit and film drive mechanism of this invention and includes an illustration of one application of the film-actuated sensing switches for controlling the functioning of related equipment.

An arrangement for projecting strip film for creating unique presentations, as shown in FIG. 1 for purposes of illustrative disclosure, includes a horizontal slide film projector, indicated generally at 20, having the usual lamp housing 21 and a lens barrel 22 in a lens mount 22M with the barrel having a lens therein for projecting light emanating from a source (not shown) located in the lamp housing, and passing through a film exposure region intermediate of the lamp housing and the projection head. As is conventional, the light is projected upon a suitable screen to image thereon the representations on the film frame or section located in the exposure region. The arrangement is provided with a mount 24 for a film payout roll, a film track 25 passing through the exposure region and provided with a window that frames the exposure region, a film drive sprocket 26 at the other end of the track and a spindle 27 for supporting and driving a film take-up roll at a point in adjacent film-receiving relation to the film drive sprocket. The sprocket 26 and spindle 27 are shown operatively associated with a variable speed drive mechanism, indicated generally at 28, which is connected by a multiple-conductor cable 29 leading to a remote control unit, indicated generally at 30.

The horizontal slide film projector is shown with the usual complement of control switches and connection cords.

The remote control unit 30 illustrated herein is set up for manual selection, and it includes an "on-off" power switch 31, a push button type "stop" switch 32, push button type speed selection switches 32A, 32B and 32C, and an auxiliary control switch button 33. Connection of power from the remote unit to the drive mechanism 28 is established through an "on-off" power switch 34.

The equipment shown in FIG. 1 finds important application in making strip film presentations in connection with advertising, display, and similar promotional work. Continuously moving presentations for parading a complete line of products or services of a particular organization are most effective. It has been found that a continuously moving strip film presentation which may be programmed as desired produces greater impact and interest and elicits a greater response from the viewing audience. The facility for making such a presentation which is offered by the present invention gives the invention many advantageous applications. In this application, the projector may be controlled from a remote point and the speed at which the film strip is drawn past the exposure window of the film track may be regulated in accordance with the type of presentation being made. Push buttons 32A, 32B and 32C are each operable to select a different speed, while push button 32 is operative to disengage the motor drive from the drive sprocket and stop the film at any selected point therealong.

In FIG. 2, a section 40 of a prepared strip film for use in the projection equipment of FIG. 1 is shown provided with index markings in the form of notches along its upper and lower edges. The projection equipment includes facilities for sensing these notches for controlling auxiliary equipment on the main projector such as a brake or a douser and/or for controlling an auxiliary projector or other device that may be utilized in conjunction with the main projector. For example, the notch 40L along the bottom of the strip film may operate a sensing device controlling an electrical switch that stops or disconnects the drive mechanism from the drive sprocket 26, and thus an accurate indexing of the stop notches will provide for automatically and accurately stopping the strip film in a predetermined centered position across the projection path.

Since there is limited clearance at the actual exposure region, the sensing devices are preferably located to one side thereof, and correspondingly, the stop notch 40L, which is actually indexed with the film frame indicated at 40A, is off-set lengthwise therefrom. For the illustrated strip film section, the notch 40L will automatically disconnect the drive mechanism from the film drive sprocket and cause the frame "10 weeks" to stop over the exposure region. The equipment may be set for an automatically timed dwell interval at its selected stop positions or, as illustrated herein, it may utilize manual operation of one of the speed selection push button switches of the speed control unit 30 for triggering the next advance of the film.

An auxiliary notch 40U is indexed along the upper edge of the strip film and it will be understood that it becomes effective when film frame 40B is at the exposure region. The sensing device associated with the film edge in which the notch 40U is provided may control a douser for the main projector in the event that it is desired to mask the image on frame 40B. The douser may be operated for a timed interval during which other panels, in the absence of a stop notch 40L, will also pass through the track unseen, or it may be set to require manual restoration, as desired. Alternatively, the notch 40U may control the dousing or the starting and stopping of an auxiliary projector having a strip film programmed for simultaneous or sequential presentation in conjunction with the strip film of the main projector. The index marking or notches might also be used to key the operation of a programmed sequence of audio effects relating to the film presentation of the main projector.

FIG. 3 illustrates an arrangement wherein the main projector 20, together with its drive mechanism 28 and remote control unit 30, are shown associated with an auxiliary strip film projector 45 which is operated completely under the control of the main projector to impose spot images over part of the projected image from the main projector. The strip film shown in FIG. 3A is for the main projector, while the strip film shown in FIG. 3B is for the auxiliary projector.

To illustrate one type of presentation which is conveniently made possible with the equipment of the present invention, the projection system of FIG. 3 is described in detail in conjunction with the strip films shown in FIGS. 3A and 3B. It will be assumed that the strip film in the main projector is running continuously at some selected speed until the notch 46U actuates a sensing switch (not shown) which is connected over control line 47 to turn on the auxiliary slide film projector 45. At this time, frames 20A and 45A are imaged simultaneously on the projection screen 43, and with the film frame 45A stationary on the screen, the images from frames 20A, 20B and 20C progressively parade across the screen. For such a presentation, the spot image from film frame 45A may comprise the trademark or trade name which is applicable to the bottles of beer shown in frame 20A, the cans of beer shown in frame 20B, and the cases of beer shown in frame 20C.

When these items are paraded across the screen, the notches 47U (a "turn-off" notch for the auxiliary projector) and 47L (a "stop" notch for the main projector) are presented to the upper and lower sensing devices. Film frame 20D may comprise extensive written material for which it is desired to fix the presentation stationary for a sufficient time to permit the written material to be digested. This time interval may be controlled automatically or the strip may be set in motion manually until the next notch 48L arrives at the sensing station to again stop the main projector so that frame 20E, which is a bar chart representative of sales volume, may be analyzed and discussed.

When the film is again drawn through the main projector, the notch 49U turns on the auxiliary projector to project frame 45B onto the screen simultaneously with the projection of frames 20F, 20G and 20H, which contain representations of different bottles of liquor which are all marketed under the trademark appearing on frame 45B. Following this, notches 50U (a "turn-off" notch for the auxiliary projector) and 50L (a "stop" notch for the main projector) come into play, and the image of written material on the frame 20I is projected onto the screen for a desired interval of time. The film in the main projector is then moved forward another frame and is stopped by notch 51L to fix the frame 20J having another bar chart of sales growth. The main projector is again actuated and the notch 52U is sensed to turn on the auxiliary projector and image the two trademarks shown on panel 45C in conjunction with the sales curves for the items sold under these trademarks, the sales curves being shown on frame 20K.

In FIG. 4, a pair of master projectors 55 and 56 are shown in conjunction with their drive mechanisms 28 and 28′, respectively, and their control units 30 and 30′, respectively. The film strip of FIG. 4A is used in projector 55 while the strip of FIG. 4B is used in projector 56. It will be assumed that the strip film of FIG. 4A is moving from right to left and that the film frame 55A is leaving the exposure region so that "stop" notch 58L is sensed to temporarily stop projector 55 with frame 55B at the exposure region. Thereafter, the projector 55 automatically advances its film until notches 59U (a "turn-on" notch for projector 56) and 59L (a "stop" notch for projector 55) are sensed, with projector 55 being stopped at frame 55D, which is represented as a blacked-out area. At this time, the projector 56, which previously was stopped at blacked-out frame 56A, is triggered to advance in a continuous fashion and display the products shown on film frames 56B and 56C. This brings notches 60U (a "turn-on" notch for projector 55) and 60L (a "stop" notch for projector 56) into cooperation with the sensing devices to stop projector 56 with the blacked-out film frame 56D at the exposure region, while turning on projector 55 to continuously advance its film frames 55E and 55F across the screen. It will be assumed that film frames 55E and 55F illustrate "A" products that are competitive with the "B" products illustrated in film frames 56B and 56C, respectively.

As projector 55 continues, film notch 61U turns on projector 56 so that both projectors are active simultaneously, with film frames 55H and 55I being projected on the screen in conjunction with film frames 56E and 56F, respectively, in order to provide direct comparison between each type of competitive product. Notches 62L and 63L then stop both projectors so that explanatory written material from frames 55J and 56G may be imaged simultaneously.

It will be apparent that the film indexing arrangements illustrated herein may be widely varied and combined in a number of different relationships, depending upon the type of presentation that is required. The presentations may be controlled from an automatic programming arrangement if desired or may be operated manually, in whole or in part. The continuously moving strip film type of presentation, however, has found enthusiastic acceptance and offers an important new tool for commercial promotional work in connection with advertising, display, educational, and informational programs.

Attachment Unit

The film-handling and drive mechanism of this invention, as illustrated in FIGS. 5 and 6, is in the form of an attachment unit that is adapted for convenient use with existing projectors. The mechanism for controlling and driving the film is a self-supporting structure that is directly applicable to existing projectors without need of modification thereof. As shown in FIG. 5, the film track has a rearwardly projecting mounting arm attached to a vertical side wall of the support housing H for the drive mechanism and the film track extends outboard therefrom to project through the exposure region to terminate therebeyond in the mount 24 for a film payout roll. The mount 24 has a base wall 24B that carries an upstanding spindle post 24P and a protective surrounding wall 24S. The film track 25 may be of any conventional construction and, as shown, includes the usual window 25W flanked by upper and lower flanges 25F that define guideways for the edges of the strip film. A fragment of a pressure plate for holding the film in the track is indicated at 65.

A microswitch type sensing unit 68 is located at the top of the film track at a position to the left of the framing window and has a roller 68R on its movable sensing arm 68A biased to ride against the adjacent upper edge of the film moving through the track such that the roller automatically enters into each notch along the upper edge of the film to allow the arm 68A to close its switch contacts. Another microswitch type sensing unit 67 is located at the bottom of the film track at a corresponding position to the left of the viewing window thereof and has a roller 67R on its movable sensing arm 67A biased to ride against the lower edge of the film and to enter into each edge notch therealong to allow the arm 67A to open its switch contacts. In the illustrated arrangement, the upper microswitch may control auxiliary equipment such as a douser device or such as an auxiliary projector or an auxiliary recording, while the lower microswitch may control the drive mechanism that draws the film along the track.

The film drive sprocket 26 is rotatably mounted on the support housing for the drive mechanism and, as is explained hereinafter, is directly driven thereby. The sprocket is positioned to engage and draw off the film from the exit end of the film track 25 and a pressure pad or shoe 69 is mounted for pivoting movement about a vertical pin 70 (FIG. 5) and is biased to hold the film in proper engagement against the sprocket wheels 26W. A framing knob, as indicated at 26K, may be provided at the upper end of the drive sprocket, while the lower end of the drive sprocket is provided with a pulley 26P connected by a tubular belt 71 to a pulley 27P on the rotatable spindle 27 for the film takeup which also includes a base wall 27B. Thus, rotation of the film drive sprocket 26 draws the film through the film track 25 and simultaneously drives the takeup spindle 27 for winding the film onto it.

In order to accommodate direct mounting of the attachment unit on existing slide film projectors, the upper and lower rails of the film track are hollowed out, as indicated at 25H, to provide mechanical clearance for the usual intermittent motion type film drive sprocket 72 (see FIG. 1) which constitutes an original part of the projector. When the attachment unit is applied to the projector, the drive sprocket 72 is not utilized. It will be noted that with the illustrated attachment unit, the film is drawn through the machine from right to left, as viewed in FIG. 1, whereas in normal use the sprocket 72 would draw the film from left to right, as viewed in FIG. 1.

To install the attachment unit on the projector, the film track is positioned above its mounting location and lowered into position. The weight of the support housing H for the drive mechanism may actually be suspended from the film track which is fixed to and extends outboard from the housing but if desired, an adjustable support leg 35 is provided for stabilizing the housing and projector assembly.

While the invention is illustrated in its embodiment as an attachment unit, and while it finds particularly advantageous use in this application since it serves to convert existing slide film projectors to an automatically controlled, power-driven strip film projector at a minimum of expense, it will be appreciated that the novel features of the invention also have important application in original equipment.

Variable Speed Drive

The drive mechanism, indicated at 28 in FIGS. 1, 5 and 6, is shown in greater detail in FIGS. 7 and 8, wherein an electric motor 75 is mounted on a support bracket 76 provided internally in the housing with the motor shaft extending through the bracket and coupled to the free end of an output drive shaft 77, the other end of which is journalled in a bearing 78 on the end wall of the housing. The output drive shaft is of stepped diameter along its length to provide three separate sections 77A, 77B, and 77C of different diameter on the single shaft. A driven shaft 80 is journalled at one end in a bearing 81 on the end wall of the housing and at its opposite end it receives a worm gear 82 that is fixed thereto by a set screw 82S with the end of the shaft 80 being journalled in a suitable internal bracket 83. The worm 82 meshes with a worm gear 84 depending from the film drive sprocket 26. The driven shaft has three separate circular collars 80A, 80B and 80C of different diameter fixed thereon and aligned, respectively, with the three different diameter sections 77A, 77B, and 77C of the output drive shaft of the motor. The largest diameter section 77A of the output shaft is associated with the smallest diameter collar 80A on the driven shaft, and so on, for defining three speed ratio relationships between the shafts 77 and 80.

Separate friction wheels 85A, 85B and 85C are provided for driving engagement between each cooperating pair of shaft diameters, and the positioning of the friction wheels is under the selective control of three separate solenoids, correspondingly designated 86A, 86B and 86C, which in turn are controlled by the push button speed selector switches 32A, 32B and 32C on the control unit 30 of FIG. 1. The mounting connections for the friction wheels are essentially the same and may be understood from a description of friction wheel 85A, which is rotatably carried on a link 87A fixed intermediately on an arm 88A which is pivotally suspended at its upper end for limited swinging movement of its lower end in a guide slot provided in a rigid locator block 89. A spring 90A connected to the lower end of the pivot arm normally urges the same to an inoperative position wherein it abuts the block 89 and has its friction wheel free from driving engagement between the shaft sections 77A and 80A. In FIG. 8, friction wheel 85A is shown in its operative driving positions while friction wheels 85B and 85C are shown in their inactive positions.

The armature of solenoid 86A is connected to the lower end of the pivot arm 88A by a link 91A; and upon energization of the solenoid, the spring 90A yields to permit the pivot arm 88A to swing clockwise, as viewed in FIG. 8, sufficiently to carry the friction wheel 85A into driving engagement between the output drive shaft and the driven shaft. A brake shoe 93 is shown pivotally mounted on a shaft 94 that extends through the housing; and by means of a wire spring (not shown) or other suitable resilient element, the brake shoe is normally biased to engage the shaft collar 80C for immediately stopping the free-wheeling driven shaft whenever all of the friction wheels are inactive. A common actuating lever 95 is provided for releasing the brake shoe 93 whenever a friction wheel is activated. The lever 95 is connected to rotate the shaft 94 and extends across all three pivot arms for engagement by any one of these arms as it is moved under the influence of its solenoid to bring its friction wheel into play. Whenever the solenoid releases, the pivot arm falls free and enables the brake shoe to stop the driven shaft immediately. Since the brake must not overcome the inertia of a motor, it gives an accurate stop control suitable for reliably centering any desired film frame at the exposure region.

Control Circuit

A typical control circuit for the equipment of FIG. 1 is shown in FIG. 9 wherein the circuit elements of the film drive mechanism 28 are shown grouped at the bottom of the figure and the circuit elements of the control unit 30 are shown grouped at the top of the figure, with the multiple-conductor cable 29 extending between these units.

The motor 75 is shown connected across the input power lines L—L and it is connected in series with the parallel-connected power switches 31 and 34, the former being associated with the remote control unit and the latter being associated with the drive mechanism. When either of these power switches is closed, the motor runs continuously; but the film drive sprocket is inactive until a solenoid is energized to shift its friction wheel into active position.

As indicated, the solenoids 86A, 86B and 86C for controlling the friction wheels are arranged in parallel circuit connection, and each solenoid is connected by a conductor of the cable 29 to a different contact in a multiple-path control circuit that is comprised of the three separate push button switch mechanisms 32A, 32B and 32C. These push button switch mechanisms are of a general type commonly used on automobile radios in that once it is depressed it remains depressed until a related push button switch mechanism is actuated to release the first switch mechanism, with the second switch mechanism then remaining depressed. The "stop" push button switch 32 has no contacts and is provided to give a manually operated mechanical release for restoring the speed selection switch mechanisms. As illustrated, each of the speed selecting push button switches has an actuating rod 96A, 96B and 96C, respectively, for positioning pairs of contact arms 97A and 98A, 97B and 98B, and 97C and 98C. These contact arms for the three speed selector push button switches are connected in a cascading fashion such that a circuit path through any one of the solenoids first passes through the bottom contact arm of one of the push button switches and then through the top contact arm of an adjacent push button switch.

In the "up," or unactuated position, each of these push button switches has its top contact closed and its bottom contact open and the circuit paths for all of the solenoids are open at the bottom contacts. When a switch mechanism is depressed or in its actuated position, the top contact is open and the bottom contact closed, as is indicated in the case of switch 32A, and the path is established through the solenoid 86A which is connected to the bottom contact of the actuated switch.

In accordance with this invention, the speed selecting push button actuated switch mechanisms are the same as the switch 32A which, as shown in FIG. 10, has a camming member 100 operable against a common actuator plate 101 which physically extends alongside all of these three switches. Each of these switches, upon being depressed and operating its contacts as described, is arranged to provide a limited extent of overtravel motion, and during this overtravel motion, the camming member of the depressed switch contacts and deflects the plate 101 to momentarily actuate a bypass or starting switch 102 that is electrically connected in parallel with the stop microswitch 68 that senses the edge notches along the top of the strip film in the film track.

In the present instance, these parallel-connected switches 68 and 102 are in series-circuit relation with the selected solenoid and so long as one or the other is closed, the solenoid remains energized and the drive mechanism operates through the corresponding friction wheel to drive the film drive sprocket for continuously drawing the strip film through the film track at a predetermined speed.

This stop microswitch 68 is in its normally open condition when its actuating arm 68A is able to enter an edge notch in the film. When the actuating arm 68A is restrained by engagement against the edge of the film, the stop switch is held closed. Thus, if it is assumed that the film is stationary with the stop microswitch having its arm in a stop notch such that the switch 68 is open, the film drive is started by depressing one of the push button switches so that its over travel motion momentarily closes bypass switch 102 to complete an energizing circuit for the selected solenoid. Movement of the film causes the stop switch 68 to move to closed position so that film movement is maintained after the push button switch is released. The film drive operates until the microswitch arm enters another stop notch to open switch 68 and deenergize the operated solenoid, whereupon the spring 90A retracts its pivot arm to shift the corresponding friction wheel free from driving engagement between the output shaft and the driven shaft and allow the brake shoe to bring the driven shaft and the film drive sprocket to an immediate stop.

The illustrated circuit arrangement includes auxiliary circuit paths for control by notches along the opposite edge of the film strip. It will be understood that these notches may control any of a variety of related devices and auxiliary equipment. This auxiliary control circuit is connected across the power lines L—L through one or both of the power switches 31 and 34 and includes the microswitch 67 which is normally closed and in series connection therein. This switch is termed "normally closed" since it is closed when its actuating arm enters into an auxiliary film notch and it is open when the regular film edge engages the roller carried by the microswitch-actuating arm. The control circuit includes a locking type A.C. relay 103 controlling a contact arm 103A in an auxiliary control circuit 104 that is to be connected to the auxiliary equipment to be controlled.

The first time the operating coil of the locking relay 103 is energized, its contact arm 103A is shifted from its illustrated stable position against the first contact 104A to its other stable position against the second contact 104B. The second time it is actuated, the contact arm shifts back to engagement with the first contact.

To protect the sensitive operating coil of the locking relay against burn-out, a D.C. relay 105 is connected across the power lines and has its contact arm 105A in series with the locking relay 103. Assuming the auxiliary circuit is energized upon sensing microswitch 67 entering an auxiliary notch, the locking relay 103 first picks up to actuate its contact arm 103A and after a short interval, the D.C. relay 105 picks up to open the circuit at contact arm 105A and remove power from the coil of the locking relay. A manual push button switch 33 at the control unit is connected to shunt the microswitch 67 to provide for manual actuation of the locking relay when desired.

The control circuit from the locking relay may, in one instance, operate a douser for the main projector, or it may be set to trigger an auxiliary projector or other auxiliary device which it is desired to synchronize with the presentation on the main projector.

Continuous Strip Film Projector

A novel self-contained unit for continuously projecting strip film is shown in FIG. 11 wherein the projector is designated generally at 120 and is shown as including a lens barrel 122 disposed in a lens mount 122M with the barrel having a lens 122L for projecting light emanating from a source located in the lamp housing 121 of the projector and passing through a film exposure region intermediate of the lamp housing and the projection head.

The arrangement is provided with a film track 125 passing through the exposure region and provided with a window, not shown, that frames the exposure region. A strip film 130 in the form of an endless ribbon is arranged sequentially about the inner rim of a storage and spool 131, then around an eccentric guide spool 132, and a case mounted guide spool 133, then through the film track 125 and around a film drive sprocket 134, and guide spool 135, and then several loops around spool 131 and a companion storage and guide spool 136 to form an endless path.

This type of projector finds important application in making continuous motion strip film presentations in connection with advertising, display, and similar promotional work. In accordance with the invention the strip film may be suitably notched at indicated at 130N in FIG. 12 to cooperate with a sensing arm 138 for automatically stopping the strip film for a predetermined dwell interval during which certain selected sections of the film are displayed in a stationary presentation to permit the viewer to study certain details.

A control circuit arrangement for automatically stopping the strip film, for automatically timing a predetermined dwell interval thereof, and for automatically restarting the strip film is shown in FIG. 12. The sensing arm 138 may be biased to ride against the edge of the strip film for moving inwardly of this edge into the notch 130N for operating its switch mechanism 139. The switch mechanism has a contact pole 139P selectively connectable between a normally closed contact that defines a junction point 140 which is connected in series with a drive motor 141 for the film drive sprocket 134 and a normally open contact which defines a junction point 142 in series with a timing motor 143. A bypass circuit 144 is bridged across these junction points and includes a normally open switch 145 controlled by an actuating arm 146 that rides against a rotatable cam 147 which is driven by the timing motor.

The cam 147 has successive raised and lowered surface portions 147R and 147L, respectively, and for the arrangement shown, two raised and two lowered sections occupy a complete circle of revolution of the cam. When the actuating arm 146 cams against a raised surface portion 147R it holds the switch 145 open and when it cams against a lowered surface portion 147L it permits the switch 145 to close.

The operation of this control circuit may now be described.

Beginning at a time when the strip film 130 is moving continuously through the film track and a notch 130N is approaching but has not yet reached the sensing arm 138, it will be apparent that the switch mechanism 139 will be positioned as illustrated in FIG. 12 wherein its contact pole 139P establishes an energizing circuit to junction point 140 which connects to the film drive motor 141 for driving the sprocket 134 and continuously advancing the film. At this time, the cam 147 is stationary and the actuating arm 146 controlled by it rests against a point at the beginning of a raised surface portion 147R.

As the notch 130N arrives at the location of the sensing arm 138, the arm 138 moves inwardly into the notch and brings the pole 139P against the lower contact for first breaking the circuit to junction point 140, thereby stopping the film drive motor 141, and for establishing an energizing circuit to junction point 142 for energizing the timing motor 143 to rotate the cam in the direction indicated by the arrow 150. While the actuating arm 146 is riding along the raised portion 147R of the cam, the switch 145 remains open. The length of the surface portion 147R, together with the speed of rotation of the cam (which will be assumed to be constant) therefore determines the dwell interval during which the film drive motor 141 remains stationary. As the surface portion 147L moves past the arm 146, switch 145 closes and establishes an energizing circuit from junction point 142 through the bypass circuit 144 to junction point 140 and then to the film drive motor 141.

This initiates the film drive motor 141 and as the film movement carries the notch 130N past the sensing arm 138, the switch 139 restores to its initial position, with the circuit to motor 141 then being completed directly to junction point 140 and with the circuit to the timing motor being completed over the bypass circuit 144. The cam continues to rotate until its second raised surface portion 147R elevates the arm 146 and opens switch 145. All the parts are then in their initial position ready for a subsequent notch to appear.

This automatic timing arrangement is simple and inexpensive in construction and extremely reliable in operation and while it is illustrated in connection with an endless film arrangement, it will be apparent that it may also be used with any form of strip film and with any desired sensing and film indexing technique.

In FIG. 11 the projector 120 is illustrated mounted within a compact portable carrying case 151, such as might be used in applications where the projector is frequently carried from place to place such as for example for providing film presentations at the plants of various companies. In FIG. 13, however, the projector 120 is shown located within a projection cabinet 152 which is fitted with a self-contained projection screen 153, such units are particularly suited for application in commercial establishments wherein the cabinet is mounted at a convenient viewing location and, preferably, incorporates an endless strip film, that is run continuously to repeatedly display a series of articles that are available for purchase by the customers. An automatic self-contained unit of this type can importantly increase sales without requiring any attention upon the part of the store personnel.

While we have shown and described our invention in a preferred form, we are aware that various changes and modifications may be made without departing from the principles of the invention, the scope of which is to be determined by the appended claims.

We claim:

1. In a slide film projector, the combination with means for projecting light along a projection path; of a film track disposed crosswise of said path and having a window intercepting said path, a strip film in said track and having edge index markings thereon at selected points therealong, each of which points having a predetermined spatial relationship to an individual corresponding film section thereof which is to be stopped in centered position across said window, a rotatable drive sprocket at the exit end of said track engageable with a strip film movable in said track to draw successive sections of the film across said window as said sprocket rotates, selectively operable control means including a motor drive for said sprocket and having first means operable to engage said motor drive for continuous rotation of said sprocket and second means operable to brake said sprocket to a stop, and sensing means located at a point having a spatial relationship to said window corresponding to said predetermined spatial relationship between an index marking and a film section corresponding thereto, said sensing means being connected to respond to an index marking for operating said second means.

2. In a slide film projector having means for projecting a light beam along a predetermined path, a film track disposed crosswise of said path and having a window framing said beam, a strip film in said track and having edge index marking thereon at a point having a predetermined spatial relationship to a given section of said film, drive means operable for moving said film through said track to draw successive sections of the film across said window, electric circuit means for controlling said drive means and including a circuit path having in series therein a normally open contact and a control device for actuating said drive means, a switch mechanism for momentarily closing said normally open contact to complete a circuit through the control device, an auxiliary contact connected to bypass said normally open contact, sensing means located at a point having a spatial relationship to said window corresponding to the spatial relationship between said index marking and said given section and responsive to said index marking to deactuate said control device and to actuate a mechanism for braking the drive means at the time said given section of film is located across said window.

3. In a slide film projector having means for projecting a light beam along a predetermined path, a film track disposed crosswise of said path and having a window framing said beam, a strip film in said track and having edge index marking thereon at a point having a predetermined spatial relationship to a given section of said film, drive means normally operable for continuously moving said film through said track to draw successive sections of the film across said window at a continuously flowing predetermined rate, and sensing means located at a point having a spatial relationship to said window corresponding to the spatial relationship between said index marking and said given section and responsive to said index marking for stopping said drive means when said given section of film is located across said window, and timing means operable by said sensing means to undergo a predetermined dwell period and thereafter to restart said drive means independently of said sensing means.

4. In a slide film projector, the combination with means for projecting light along a projection path; of a film track disposed crosswise of said path and having a window intercepting said path, a strip film in said track and having edge index markings thereon at selected points therealong, each of which points having a predetermined spatial relationship to an individual corresponding film section thereof which is to be stopped in centered position across said window, a rotatable drive sprocket at the exit end of said track engageable with a strip film movable in said track to draw successive sections of the film across said window as said sprocket rotates, control means including a motor drive normally operable for continuously rotating said sprocket to draw said film across said window at a continuously flowing predetermined rate, sensing means located at a point having a spatial relationship to said window corresponding to said predetermined spatial relationship between an index marking and a film section corresponding thereto, said sensing means including switch means controlled thereby to stop said motor drive when said sensing means responds to an index marking, and timing means connected to restart said motor drive after undergoing a predetermined dwell interval, said timing means being connected for actuation by said switch means when said sensing means responds to an index marking.

5. In a slide film projector having means for projecting a light beam along a predetermined path, a film track disposed crosswise of said path and having a window framing said beam, a strip film movable along said track and having a notch opening through an edge thereof at a point having predetermined spatial relationship to a given section of said film, drive means normally operable for continuously moving said film along said track to draw successive sections of the film across said window at a continuously flowing predetermined rate, control means including a switch mechanism for stopping said drive means and timing means also controlled by said switch mechanism for restarting said drive means after a predetermined dwell interval, said switch mechanism having a movable actuating arm disposed along said track at a point having a spatial relationship to said window corresponding to the spatial relationship between said notch and said given section of film, said arm being biased to ride against said edge of the film and to move inwardly thereof into said notch to operate said switch mechanism at the time that said given section of film is at said window, such that said given section of film remains at said window for said predetermined interval.

6. In a slide film projector having means for projecting a light beam along a predetermined path, a film track disposed crosswise of said path and having a window framing said beam, a strip film in said track and having index marking thereon at a point having a predetermined spatial relationship to a given section of said film, drive means operable for moving said film through said track to draw successive sections of the film across said window, timing means operable for undergoing a predetermined dwell interval and for thereafter operating a first actuating arm, electric circuit means including a switch mechanism having a normally closed contact in series with said drive means and a normally open contact in series with said timing means, sensing means located at a point having a spatial relationship to said window corresponding to the spatial relationship between said index marking and said given section and responsive to said index marking for operating said switch mechanism to open the normally closed contact thereof and to close the normally open contact thereof and a second normally open contact bypassing said normally closed contact and operable by said actuating arm to restart said drive means after said predetermined dwell interval, with said index marking moving beyond said sensing means to restore said switch mechanism.

7. In a slide film projector having means for projecting a light beam along a predetermined path, a film track disposed crosswise of said path and having a window framing said beam, a strip film in said track and having index marking thereon at a point having a predetermined spatial relationship to a given section of said film, means including a drive motor operable to continuously move said film through said track to parade successive sections of the film across said window, and a control means for said drive motor and comprising an actuating arm, a control cam rotatable to repeatedly present first and second surface portions thereof to engage and control the position of said actuating arm, said first and second surface portions, respectively, of said cam maintaining said arm at a switch opening position and at a switch closing position, a timing motor for rotating said cam, an energizing circuit including a switch mechanism having a switch arm selectively connectible between a normally closed contact defining a junction point in series with said drive motor and a normally open contact defining a junction point in series with said timing motor, and a second switch operable by said actuating arm and having a normally open contact interposed in a bypass circuit connected between said junction points, sensing means located at a point having a spatial relationship to said window corresponding to the spatial relationship between said index marking and said given section and responsive to the arrival of said index marking for operating said switch mechanism to open the normally closed contact thereof and to close the normally open contact thereof stopping said drive motor and starting said timing motor for rotating said cam to first move said first surface portion past said actuating arm for generating a dwell interval during which said second switch remains open and to thereafter move said second surface past said actuating arm for closing said second switch and establishing a temporary energizing path to both said drive motor and said timing motor through said normally open contact of said switch mechanism and said bypass circuit, with said drive motor restarting to drive said strip film and move said index marking away from said sensing means to restore said switch mechanism and with said timing motor continuing to run until said first surface portion controls said actuating arm.

8. In a slide film projector having means for projecting a light beam along a predetermined path, a film track disposed crosswise of said path and having a window framing said beam, a strip film in said track and having a notch opening through an edge thereof at a point having a predetermined spatial relationship to a given section of said film, means including a drive motor operable to continuously move said film through said track to parade successive sections of the film across said window, and a control means for said drive motor and comprising an actuating arm, a control cam rotatable to repeatedly present first and second surface portions thereof to engage and control the position of said actuating arm, said first and second surface portions, respectively, of said cam maintaining said arm at a switch opening position and at a switch closing position, a timing motor for rotating said cam, an energizing circuit including a switch mechanism having a switch arm selectively connectible between a normally closed contact defining a junction point in series with said drive motor and a normally open contact defining a junction point in series with said timing motor and a second switch operable by said actuating arm and having a normally open contact interposed in a bypass circuit connected between said junction points, said switch mechanism having a movable sensing arm disposed along said track at a point having a spatial relationship to said window corresponding to the spatial relationship between said notch and said given section of film and means biasing said sensing arm to ride against said edge of the film and to move inwardly thereof into said notch for operating said switch mechanism at the time said given section of film is at said window to open the normally closed contact thereof and to close the normally open contact thereof thereby stopping said drive motor and starting said timing motor for rotating said cam to first move said first surface portion past said actuating arm for generating a dwell interval during which said second switch remains open and to thereafter move said second surface past said actuating arm for closing said second switch and establishing a temporary energizing path to both said drive motor and said timing motor through said normally open contact of said switch mechanism and said bypass circuit, with said drive motor restarting to drive said strip film and move said notch away from said sensing arm to restore said switch mechanism and with said timing motor continuing to run until said first surface portion controls said actuating arm.

9. In a slide film projector, the combination with means for projecting light along a projection path; of a film track disposed crosswise of said path and having a window intercepting said path, a strip film in said track and having edge index markings thereon at selected points therealong, each of said points having a predetermined spatial relationship to a corresponding individual film section thereof which is to be stopped in centered position across said window, means drivingly engaged with said strip film for drawing the strip film along said track at a continuously flowing predetermined rate, brake means for the first named means for stopping movement of the film along the track, sensing means located at a point having a spatial relationship to said window corresponding to the first named predetermined spatial relationship, said sensing means being connected to respond to a said index marking along said film for operating said brake means to stop said film at a point where the film section corresponding to the last named index marking is in registry with said window.

References Cited in the file of this patent

UNITED STATES PATENTS

| | | |
|---|---|---|
| 1,372,638 | Barker | Mar. 22, 1921 |
| 1,696,968 | Outrey | Jan. 1, 1929 |
| 1,950,518 | Read | Mar. 13, 1934 |
| 1,998,072 | Blake et al. | Apr. 16, 1935 |
| 2,025,361 | Skilling | Dec. 24, 1935 |
| 2,217,901 | Groch | Oct. 15, 1940 |
| 2,231,743 | Young | Feb. 11, 1941 |
| 2,317,854 | Groene | Apr. 27, 1943 |
| 2,341,646 | Newman | Feb. 15, 1944 |
| 2,604,007 | Hartmann | July 22, 1952 |
| 2,655,075 | Lightburn | Oct. 13, 1953 |
| 2,695,171 | Coffman | Nov. 23, 1954 |
| 2,725,787 | Jones | Dec. 6, 1955 |
| 2,790,858 | Tseng et al. | Apr. 30, 1957 |
| 2,831,075 | Dumke et al. | Apr. 15, 1958 |

FOREIGN PATENTS

| | | |
|---|---|---|
| 84,001 | Austria | May 25, 1921 |
| 522,748 | Belgium | Sept. 30, 1953 |
| 1,005,758 | France | Jan. 2, 1952 |